United States Patent

Mademann

[11] Patent Number: 6,081,723
[45] Date of Patent: Jun. 27, 2000

[54] METHOD AND ARRANGEMENT FOR THE LOCATION AREA MANAGEMENT IN A CELLULAR MOBILE RADIOTELEPHONE NETWORK

[75] Inventor: Frank Mademann, Berlin, Germany

[73] Assignee: Siemens Aktiengesellschaft, Munich, Germany

[21] Appl. No.: 08/825,169

[22] Filed: Mar. 26, 1997

[30] Foreign Application Priority Data

Mar. 26, 1996 [DE] Germany .............................. 196 11 947

[51] Int. Cl.[7] ...................................... H04Q 7/20
[52] U.S. Cl. ........................ 455/456; 455/432; 370/338; 370/409
[58] Field of Search .................................... 455/422, 432, 455/433, 435, 456, 457, 517, 426, 525, 458; 370/328, 329, 338, 349, 389, 400, 409

[56] References Cited

U.S. PATENT DOCUMENTS

| | | | |
|---|---|---|---|
| 5,123,111 | 6/1992 | Delory et al. | 455/432 |
| 5,590,398 | 12/1996 | Matthews | 455/432 |
| 5,675,628 | 10/1997 | Hokkanen | 455/433 |
| 5,684,859 | 11/1997 | Chanroo et al. | 455/456 |
| 5,697,064 | 12/1997 | Okamoto et al. | 455/456 |
| 5,711,008 | 1/1998 | Gallant et al. | 455/432 |

OTHER PUBLICATIONS

European Telecommunications Standards Institute, Draft GSM 03.60, Preliminary Draft Version: 0.13.0, Feb. 23, 1996, Digital Cellular Telecommunications System; (Phase 2+); General Packet Radio Service (GPRS) Service Description; Stage 2, pp. 1–5, 25–26, 28–30 & 40.

*Primary Examiner*—Reinhard J. Eisenzopf
*Assistant Examiner*—Sam Bhattacharya
*Attorney, Agent, or Firm*—Hill & Simpson

[57] ABSTRACT

At least one virtual location area identifier (SG-LAC) that does not correspond to any of the location area identifiers for real location areas in the mobile radiotelephone network is allocated to a packet data service network node (SGSN) with which a packet data service is controlled in the mobile radiotelephone network for the transmission of one or more data packets. This is employed by a mobile switching center for the implementation of the functions in the location area management. As a result thereof, a common and efficient management of location areas (locations areas, routing areas) can be achieved upon involvement of the packet data service in the cellular mobile radiotelephone network without the standard interfaces and procedures for the mobile switching center having to be modified for this purpose.

8 Claims, 2 Drawing Sheets

METHOD AND ARRANGEMENT FOR THE LOCATION AREA MANAGEMENT IN A CELLULAR MOBILE RADIOTELEPHONE NETWORK

BACKGROUND OF THE INVENTION

The present invention is directed to a method and to an arrangement for location area management in a cellular mobile radiotelephone network.

One or more radio cells are respectively combined to location areas {referred to below as LA location areas) in cellular mobile radiotelephone networks such as, for example, in the digital mobile radiotelephone network according to the GSM standard (Global System for Mobile Communication). A location area is a region in which a radiotelephone subscriber can move arbitrarily without requiring an updating of the location information that is utilized for defining the location of the radiotelephone subscriber. The size of a location area is defined, for example, by the network operator in order to cover the demands raised by traffic density and flow, population density and subscriber mobility. When a radiotelephone subscriber station leaves the location area, an updating (location update) of the location information is initiated. In location area management, location area identifiers are employed for the identification of the location areas, these being capable of being interpreted in the individual mobile switching centers to which a respective visitor register (visitor location register) is allocated.

The mobile switching center with the appertaining visitor register receives the location information about the respective location area with a signaling procedure that sequences between the radiotelephone subscriber station of the radiotelephone subscriber and the mobile radiotelephone network. The mobile switching center assumes jobs of mobility management such, for example, the transmission of a paging given a call directed to the radiotelephone subscriber, the updating of the location information given a change in location area, handing a call connection over from one radio cell to another radio cell (handler), etc. The LA location areas in the GSM mobile radiotelephone network should, on the one hand, be large so that the information about the location area need be changed as seldom as possible and so that the signaling load in the location area management is kept as low as possible; on the other hand, there is a desire for small areas in order to have to transmit the paging in optimally few radio cells.

A packet data service (GPRS, General Packet Radio Service) can be utilized in the GSM mobile radiotelephone network, whereby one or more data packets are transmitted burst-like between the radiotelephone subscriber station and the mobile radiotelephone network (see, for example, GSM recommendation 03.60, version 0.13.0, Feb. 23, 1996). For utilizing the packet data service, location areas (routing areas) (referenced below as RA location areas) are also defined that are serviced by packet data service nodes (GPRS support nodes) (see, for example, page 28 of the GSM recommendation 03.60). These RA location areas are likewise composed of one or more radio cells that usually exhibit a smaller size than the LA location areas of the GSM mobile radiotelephone network. As warranted, they are also the same size. The location area management in the packet data service ensues with smaller RA location areas in order to implement the transmission of the data packets directly into the radio cell to the radiotelephone subscriber insofar as possible. The higher resolution of the location areas for the packet data service results, given employment of the signaling procedure according to the GSM method, in an increase of the signaling load for each mobile switching center. When, by contrast, a separate signaling procedure (for example, upon involvement of the packet data service network node)is employed only for the packet data service, two separate signaling procedures exist side-by-side for the location area management, this running counter to an efficient utilization of the radio resources in the mobile radiotelephone system.

SUMMARY OF THE INVENTION

It is an object of the present invention to provide a method and an arrangement with which a common and optimally efficient location area management can be achieved upon involvement of the packet data service in the cellular mobile radiotelephone network.

In the present invention, at least one virtual location area identifier that belongs to none of the real location areas in the mobile radiotelephone network is allocated to the packet data service network node that controls the packet data service and is employed by the respective mobile switching center for the implementation of the functions in the location area management. The mobile switching center and the functions thereof need not be modified since the virtual location area identifier can enter into the GSM signaling procedure without modification for the location area management in the control and implementation of the packet data service. The mobile switching center treats the virtual location area identifier like any other location area identifier that is transmitted to and from the radio transmission system via the interface. Nonetheless, both network equipment (the packet data service network node for the implementation of the packet data service and the mobile switching center) can be supplied with location area information within the framework of a common location area management. This effects a more efficient utilization of the radio equipment and of the radio protocol on the air interface compared to the employment of two independent signaling procedures. The outlay for assigning the virtual location area identifier in the packet data service network node is slight, and the plurality of radiotelephone subscribers serviced by a mobile switching center need not be reduced despite the higher resolution of the RA location areas for the packet data service. As a result of the virtual location area identifier, the standard interfaces and procedures defined in the GSM mobile radiotelephone network can also be employed for location area management in the packet data service without modification or adaptation of the mobile switching center.

It is advantageous, when, upon reception of a request for updating of the location information in the packet data service network node, the location information that has arrived (for example, a RA location area identifier) is replaced by the virtual location area identifier (for example, a LA location area identifier that has not been assigned) and when a dialog between the packet data service network node and the mobile switching center responsible for the updating is carried out. After the dialog, the virtual location area identifier is re-converted in the packet data service network node into the location information and the request for updating is answered therewith. The packet data service network node thus services a virtual location area that encompasses real location areas (LA location areas and RA location areas) with a great plurality of radio cells. The updating of the location information can also be implemented for smaller RA location areas within the framework of the packet data service without requiring a modification of the multiple switching center and of the function executions in the signaling of the location area management. Moreover, the updating can be foregone as long as the virtual location area has not been changed.

It is also advantageous when, given a call incoming in a mobile switching center that is directed to a radiotelephone subscriber, a radio call message with the virtual location area identifier is sent to the packet data service network node and the virtual location area identifier is converted therein into a location information on the basis whereof the radio call message is transmitted into one or more radio cells of a real location area. In this way, the transmission of the radio call message (paging) can be achieved via the packet data service network node responsible for the packet data service to radio cells of the small RA location areas without requiring a modification of the mobile switching center and of the function executions in the signaling of the location area management.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
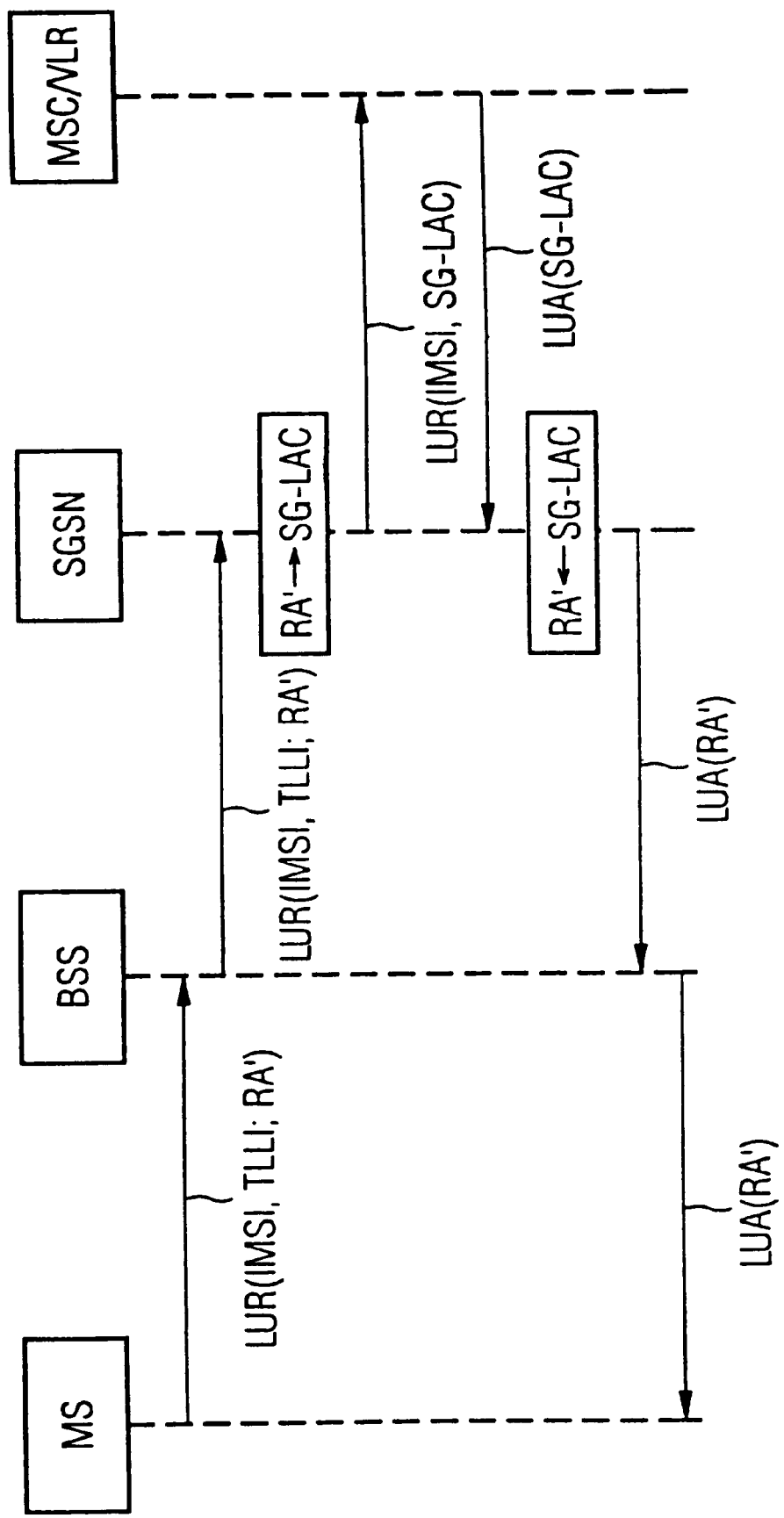
FIG. 1 depicts the message flow in the updating of the location information within the framework of the packet data service.

FIG. 1 shows a mobile radiotelephone subscriber station MS, a radio transmission system BSS with base transmission reception stations and base station controllers, a packet data service network node SGSN and a mobile switching center MSC with appertaining visitor register VRR. Using the mobile radiotelephone subscriber station MS, a mobile radiotelephone subscriber can enter into communication with other mobile radiotelephone subscribers or with subscribers of other communication networks.

Voice and data signals as useful information as well as signaling signals as control information are usually transmitted via a uniform air interface that exists between the radiotelephone subscriber station MS and the radio transmission system BSS of the mobile radiotelephone network. The radio transmission system BSS comprises a plurality of base transmission/reception stations that each respectively service one or more radio cells of the cellularly constructed mobile radiotelephone network in terms of broadcast technology. The base station controllers at which a respective plurality of base transmission/reception stations are combined form the interface of the radio transmission system to the switching system in the mobile radiotelephone network. The switching system usually comprises a plurality of mobile switching centers that are respectively responsible for one or more location areas, control the call setup for outgoing and incoming calls or, respectively, for data transmissions and execute them. Each mobile switching center is coupled to a visitor register in which the subscriber data of the radiotelephone subscribers located in the respective location area are temporarily decentrally stored. The mobile switching centers, the visitor registers and at least one home register in which the subscriber data of all radiotelephone subscribers registered in the mobile radiotelephone network are centrally stored form the switching system of the cellularly constructed mobile radiotelephone network. In the present example, the cellular mobile radiotelephone network is composed of the digital mobile radiotelephone network according to the GSM standard.

In addition to the equipment of the GSM mobile radiotelephone network, the packet data service network node SGSN is provided for processing a packet data service (general packet radio service) wherein one or more data packets are respectively transmitted surge-like in data bursts. The packet data service network node SGSN is preferably fashioned as an independent network node; however, it can also be a component part of the respective mobile switching center MSC of the switching system. In an alternative development of the network, the packet data service network node SGSN can also be inserted into the radio transmission system BSS.

With reference to the example of the location registration, FIG. 1 shows the management of the location areas given the utilization of the packet data service. RA location areas (routing areas) are formed in the execution of the packet data service, these being preferably smaller than the LA location areas usually employed in the mobile radiotelephone network. The location registration comprises a signaling procedure for updating the location information when the mobile radiotelephone subscriber leaves a location area. The visitor register may also possibly be changed given a change in location area. This signaling procedure is started by the mobile radiotelephone subscriber station MS with a request LUR (location update request) for updating the location information.

The radio transmission system BSS continuously sends a radio cell identifier and a location area identifier to all mobile radiotelephone subscriber stations. The location area identifier is stored on a chip card in the mobile radiotelephone subscriber station MS, this being compared continuously to the location area identifier received from the radio transmission system BSS. When the two location area identifiers do not agree, the mobile radiotelephone subscriber station MS initiates the signaling procedure for updating the location information. The respective location area identifier comprises a location area code, a network code and a country code. Together, they identify the location areas in the respective country of the international GSM mobile radiotelephone network.

The request LUR that is transmitted via the radio interface to the radio transmission system BSS serves the purpose of bringing the location information that is utilized for determining the current location of the mobile radiotelephone subscriber to the most recent status. It contains a temporary logical link identifier TLLI and at least one location information RA'. The location information RA' defines the new RA location area into which the mobile radiotelephone subscriber has moved. The temporary logical link identifier TLLI serves the purpose of identifying the logical link between mobile radiotelephone subscriber station MS and packet data service network node SGSN (see GSM recommendation 03.60, pgs. 26 or, respectively, 40 and 41). Optionally, the prior location information can also be co-transmitted in the request LUR in addition to the location information RA'.

Given a change of mobile radiotelephone network or upon initial registration of the mobile radiotelephone subscriber in the mobile radiotelephone network, the request LUR contains an international radiotelephone subscriber identifier IMSI instead of the temporary logical link identifier TLLI. The international mobile radiotelephone subscriber identifier IMSI serves that the unambiguous identification of the mobile radiotelephone subscriber within the international GSM mobile radiotelephone network. It is deposited as semi-permanent subscriber datum in the home register and is also temporarily found in the corresponding visitor register that is currently responsible for the mobile radiotelephone subscriber. The international mobile radiotelephone subscriber identifier IMSI is employed by the responsible visitor register VLR in order to address the correct home register in the location registration.

The radio transmission system BSS forwards the request LUR with the international mobile radiotelephone subscriber identifier IMSI or, respectively, the temporary logical link identifier TLLI and the location information RA' to the packets data service network node SGSN. When the mobile radiotelephone subscriber requests the transmission of data packets according to the packet data service and the utilization of other GSM services—which can be recognized on the basis of auxiliary information that are sent upon registration of the mobile radiotelephone subscriber or on the occasion of the first updating of the location information—, a conversion of the location information RA' ensues into a virtual location area identifier SG-LAC. The virtual location area identifier SG-LAC, which corresponds to none of the real LA location areas in the GSM mobile radiotelephone network, it is allocated to the packet data service network node SGSN in order to execute the functions in the location area management within the framework of the packet data service without modifying the existing signaling procedure of the mobile switching center MSC. The virtual location area identifier SG-LAC allocated to the packet data service network node SGSN is communicated to the mobile switching center MSC in the request LUR. Over and above this, the international mobile radiotelephone subscriber identifier IMSI is co-transmitted in order to supply the visitor register VLR or, respectively, the subscriber data stored therein for the mobile radiotelephone subscriber with current location information. It is also possible to allocate a plurality of virtual location area identifiers to a packet data service network node SGSN, each of these respectively defining virtual areas composed of real location areas.

Since a location area identifier (the virtual location are identifier SG-LAC)arrives in the mobile switching center MSC in the request LUR, the standardized signaling procedure for updating the location information can be executed. The location area identifiers are thereby stored as semi-permanent data in the respective visitor register VLR for internationally unambiguous identification of real location areas. When the mobile switching center MSC receives the request LUR with the virtual location area identifier SG-LAC from the packet data service network node SGSN, its replies to this request in a request acknowledgment LUA upon transmittal of the same location area identifier SG-LAC. After the dialog with the mobile switching center MSC, the virtual location area identifier SG-LAC is converted in the packet service data network node SGSN into the location area information RA' that is transmitted to the radio transmission system BSS in the request acknowledgment LUA and is transmitted from the latter to the requesting mobile radiotelephone subscriber station MS. In the simplest case, the mutual conversion of virtual location area identifier ST-LAC and location information RA' is composed of a replacement of the area identifier by the location information and vice versa. The conversion of the virtual location area identifier into the location information or, respectively, the back-conversion of the location information into the virtual location area identifier is carried out by the packet data service network node SGSN that has means for location area management available to it for the implementation of the packet data service.

The mobility management, which is usually the job of the mobile switching center MSC in the GSM mobile radiotelephone network, is subject to the packet data service network node SGSN in the packet data service. As a result of the allocation of the virtual location area identifier to the packet data service network node, the utilization of the standardized signaling procedures and interfaces is possible without modification of the mobile switching center and without increasing the signaling load in the smaller RA location areas (routing areas) within the framework of the packet data service. The updating procedure is implemented only given modification of the virtual location area. A common signaling procedure thus derives for the location area management in the packet data service and in all other services wherein, due to the mobility of the mobile radio telephone subscribers, specific mobile radiotelephone-specific functions such as, for example, ongoing location registration, are required.

Figure 2:
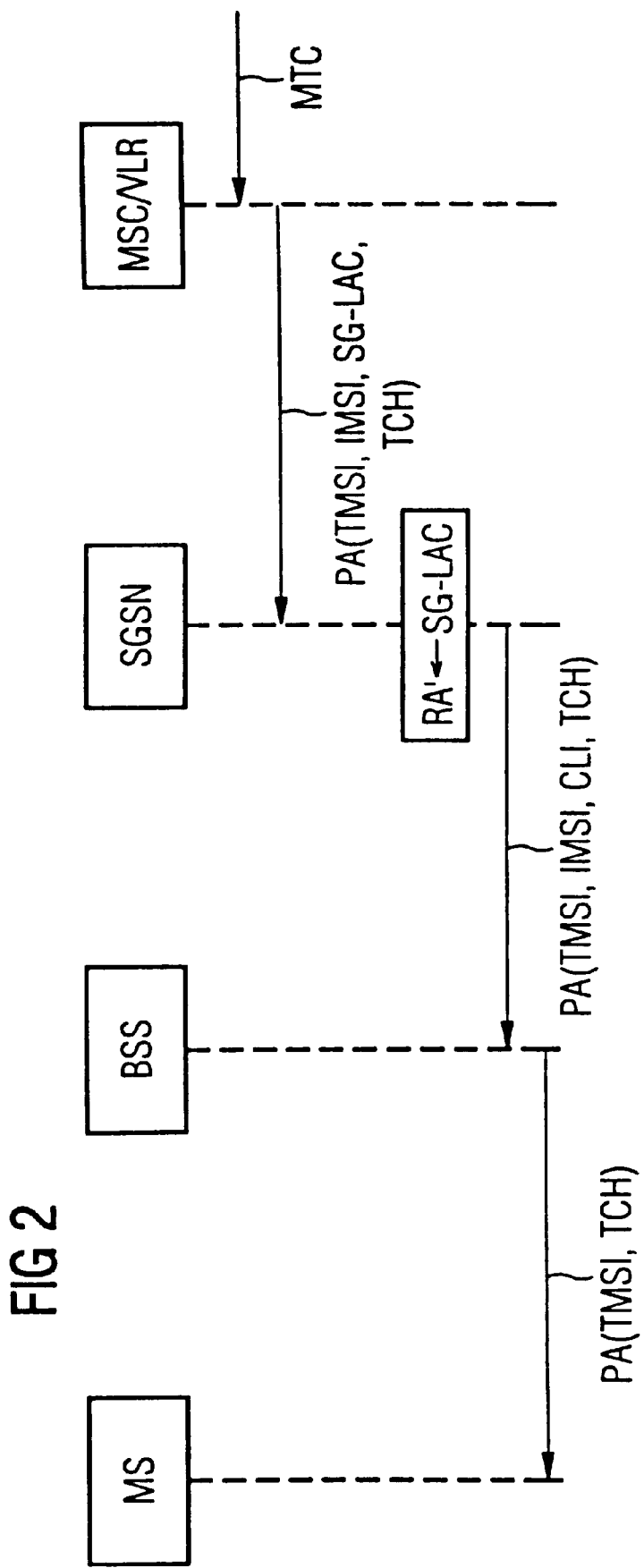
FIG. 2 depicts the message flow in the transmission of a paging within the framework of the packet data service.

A further function relating to the location area management within the framework of the packet data service is shown in FIG. 2. The example is directed to the transmission of a radio call message (paging) into one or more radio cells of a real location area for that case wherein an incoming call MTC (mobile terminating call) to a mobile radiotelephone subscriber is registered in the mobile switching center MSC. The call MTC, for example, can arrive from the public telephone network, so that the location of the called mobile radiotelephone subscriber or, respectively, of his mobile radiotelephone subscriber station MS must be identified before the call setup.

The call MTC from the public telephone network proceeds to an access mobile switching center (not shown) that determines the home register on the basis of the selected subscriber call number of the called mobile radiotelephone subscriber. The home register sends a request to the visitor register VLR in whose location area the called mobile radiotelephone subscriber is located at this moment. On the basis of a location telephone number (mobile subscriber roaming number) that is sent from the visitor register VLR to the home register, the access mobile switching center setup a connection to the mobile switching center MSC in whose location area the called mobile radiotelephone subscriber is located at this moment. The mobile switching center MSC initiates the transmission of a paging PA. Previously, it requests the location area identifier from its visitor register VLR for the identification of the location area. Usually, the location area identifier is then converted into signaling addresses in order to send the paging PA to one or more base transmission/reception stations in the identified location area. The radio cell in which the mobile radiotelephone subscriber station MS is located is not known as a rule in the mobile switching center.

In the present example, the paging PA is sent from the mobile switching center MSC to the packet data service network node SGSN and the virtual location area identifier SG-LAC that is allocated to the packet data service network node SGSN is thereby co-transmitted. The virtual location area identifier SG-LAC is stored as semi-permanent datum in the visitor register VLR in addition to the real location area identifiers. Together with the virtual location area identifier SG-LAC, a temporary mobile radiotelephone subscriber identifier TMSI and the international mobile radiotelephone subscriber identifier IMSI as well as an identifier TCH for the selection of a transmission channel are co-transmitted in the paging PA. One or more virtual location area identifiers SG-LAC and/or real or, respectively, virtual cell identifiers with which the radio cells can be identified are contained in the paging PA. For that case wherein the virtual location area identifier SG-LAC is not co-transmitted, at least the signaling address that defines the correct packet data service network node SGSN is to be offered by the mobile switching center. The packet data service network node SGSN determines the real RA location area (routing area) of the mobile radiotelephone subscriber station MS and replaces the virtual location area identifier SG-LAC with the location information RA' or, respectively, with the radio cell identifiers in order to subsequently transmit the paging PA via the radio transmission system BSS into the radio cell or, respectively, radio cells of the real location area.

The paging PA that is sent from the packet data service network node SGSN to the base transmission/reception stations of the radio transmission system BSS contains one or more lists CLI of radio cell identifiers for this purpose for the identification of the radio cells to which the temporary mobile radiotelephone subscriber identifier TMSI, the international mobile radiotelephone subscriber number IMSI and the identifier TSCH of the transmission channel are communicated. Via the selected base transmission/reception stations, the paging PA proceeds to the mobile radiotelephone subscriber stations MS whereof the mobile radiotelephone subscriber station MS of the called mobile radiotelephone subscriber reacts to the communicated, temporary mobile radiotelephone subscriber identifier TMSI. Following thereupon, the connection is setup from the mobile subscriber station MS of the mobile radiotelephone subscriber according to the known GSM standard method. For example, a separate paging channel is used for sending the paging PA on the radio interface proceeding between the radio transmission system BSS and the mobile radio subscriber station MS.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be inter-pretend as illustrative and not in a limiting sense.

What is claim is:

1. A method for location area management in a cellular mobile radiotelephone network, comprising the steps of:

allocating location area identifiers for identification of location areas in which respective mobile radiotelephone subscribers with a mobile radiotelephone subscriber station can move without incurring an updating of location information that determines a location of the mobile radiotelephone subscriber;

allocating at least one virtual location area identifier that does not correspond to any location area identifiers for real location areas in the mobile radiotelephone network to a packet data service network node with which a packet data service is controlled in the mobile radiotelephone network for transmission of at least one data packet;

using the at least one virtual location area identifier by a mobile switching center for implementing functions in the location area management;

replacing upon reception of a request for updating the location information in the packet data service network node, the location information by the virtual location area identifier;

a dialog conducting between the packet data service network node and the mobile switching center responsible for the updating using the virtual location area identifier; and replacing, following the dialog, the virtual location area identifier in the packet data service network node by the location information, and answering the request with a request acknowledgment that contains the location information.

2. A method for location area management in a cellular mobile radiotelephone network, comprising the steps of:

allocating location area identifiers for identification of location areas in which respective mobile radiotelephone subscribers with a mobile radiotelephone subscriber station can move without incurring an updating of location information that determines a location of the mobile radiotelephone subscriber;

allocating at least one virtual location area identifier that does not correspond to any location area identifiers for real location areas in the mobile radiotelephone network to a packet data service network node with which a packet data service is controlled in the mobile radiotelephone network for transmission of at least one data packet;

using the at least one virtual location area identifier by a mobile switching center for implementing functions in the location area management;

transmitting, given a call incoming in a mobile switching center that is directed to a mobile radiotelephone subscriber, a paging to the packet data service network node, based on the virtual location area identifier; and converting the virtual location area identifier in the packet data service network node into a location information, the paging being then sent via a paging channel into at least one radio cell of a real location area.

3. The method according to claim 2, wherein at least one virtual or real cell identifier for identification of radio cells in the location area management are utilized in addition to the virtual location area identifier.

4. An arrangement for location area management in a cellular mobile radiotelephone network, comprising:

location area identifiers for the identification of location areas in which mobile radiotelephone subscribers with mobile radiotelephone subscriber stations can respectively move without incurring an updating of the location information that determines the location of the mobile radiotelephone subscriber;

at least one virtual location area identifier that does not belong to any of the location area identifiers for real location areas in the mobile radiotelephone network allocated to a packet data service network node with which a packet data service can be controlled in the mobile radiotelephone network for the transmission of at least one data packet;

a mobile switching center wherein the virtual location area identifier is provided for the implementation of functions in the location area management by the mobile switching center;

means for replacing the location information by the virtual location area identifier upon reception of a request for updating the location information in the packet data service network node;

means for conducting a dialog between the packet data service network node and the mobile switching center responsible for the updating using the virtual location area identifier; and means for replacing, following the dialog, the virtual location area identifier in the packet data service network node by the location information, and answering the request with a request acknowledgment that contains the location information.

5. A method for location area management in a cellular mobile radiotelephone network, comprising the steps of:

allocating location area identifiers for identification of location areas in which respective mobile radiotelephone subscribers with a mobile radiotelephone subscriber station can move without incurring an updating of a location information that determines a location of the mobile radiotelephone subscriber;

allocating at least one virtual location area identifier that does not correspond to any location area identifiers for real location areas in the mobile radiotelephone network to a packet data service network node with which a packet data service is controlled in the mobile radiotelephone network for transmission of at least one data packet; and using the at least one virtual location area identifier by a mobile switching center (MSC) for the implementation of functions in the location area management;

wherein upon reception of a request for updating the location information in the packet data service network node, the location information is replaced by the virtual location area identifier, and a dialog is conducted between the packet data service network node and the mobile switching center responsible for the updating using the virtual location area identifier; and wherein, following the dialog, the virtual location area identifier is replaced in the packet data service network node by the location information, and the request is answered with a request acknowledgment that contains the location information.

6. The method according to claim 5, wherein at least one virtual or real cell identifier for identification of radio cells in the location area management are utilized in addition to the virtual location area identifier.

7. The method according to claim 2, wherein at least one virtual or real cell identifier for identification of radio cells in the location area management are utilized in addition to the virtual location area identifier.

8. An arrangement for location area management in a cellular mobile radiotelephone network, comprising:

location area identifiers for the identification of location areas in which mobile radio telephone subscribers with mobile radiotelephone subscriber stations can respectively move without incurring an updating of the location information that determines the location of the mobile radiotelephone subscriber;

at least one virtual location area identifier that does not belong to any of the location area identifiers for real location areas in the mobile radiotelephone network allocated to a packet data service network node with which a packet data service can be controlled in the mobile radiotelephone network for the transmission of at least one data packet;

a mobile switching center, wherein the virtual location area identifier is provided for the implementation of functions in the location area management by the mobile switching center;

means for transmitting, given a call incoming in the mobile switching center that is directed to a mobile radiotelephone subscriber, a paging to the packet data service network node, based on the virtual location area identifier; and means for converting the virtual location area identifier in the packet data service network node into a location information, the paging being then sent via a paging channel into at least one radio cell of real location area.

* * * * *